United States Patent
Strongin, II et al.

(10) Patent No.: US 8,103,570 B1
(45) Date of Patent: Jan. 24, 2012

(54) SYSTEM AND METHOD FOR CREATING AND TRADING NEAR ONE DELTA SECURITIES

(75) Inventors: Steven Harris Strongin, II, New York, NY (US); Sheila Patel, New York, NY (US)

(73) Assignee: Goldman Sachs & Co., New York, NY (US)

( * ) Notice: Subject to any disclaimer, the term of this patent is extended or adjusted under 35 U.S.C. 154(b) by 473 days.

(21) Appl. No.: 11/762,641

(22) Filed: Jun. 13, 2007

Related U.S. Application Data (60) Provisional application No. 60/804,730, filed on Jun. 14, 2006.

(51) Int. Cl.
*G06Q 40/00* (2006.01)
(52) U.S. Cl. .................................. 705/36 R; 705/37
(58) Field of Classification Search ................ 705/36 R, 705/37
See application file for complete search history.

(56) References Cited

U.S. PATENT DOCUMENTS

| | | | |
|---|---|---|---|
| 7,379,911 B2 * | 5/2008 | Lutnick | 705/37 |
| 2003/0028468 A1 * | 2/2003 | Wong et al. | 705/37 |
| 2003/0220865 A1 * | 11/2003 | Lutnick | 705/37 |

* cited by examiner

*Primary Examiner* — Jagdish Patel
*Assistant Examiner* — Sara Chandler
(74) *Attorney, Agent, or Firm* — John A. Squires; Chadbourne and Parke, LLP (57) ABSTRACT

A financial instrument is disclosed that provides spread exposure to volatility in an underlying security within an upper and lower range of prices. This is accomplished by combining a long option for the underlying security at one strike price and a short option for the underlying security at a different strike price, where difference between the two prices creates the spread exposure and the choice of option type for the high and low strikes determines whether the overall spread is short or long. The financial instrument is then priced such that the cost of the instrument prevents any possible negative value total returns at the exercise date of the underlying options. In other words, the option spread creates a lower limit on the possible downside risk in the transaction and the purchase price insures that at inception the financial instrument has no possible negative values. In this way, options market trading can be accomplished without requiring additional collateral, credit or insurance. Accordingly, such an instrument provides near one delta financial exposure.

12 Claims, 7 Drawing Sheets

NODS Pricing Example
Long NODS $60/$70 Spread
Stock Currently Trading at $63.00

| | |
|---|---|
| Sell $70 Strike Put | $7.30 |
| Buy $60 Strike Put | ($1.05) |
| Put Net | $6.25 |
| Put Exposure | ($10.00) - $0.00 |
| NODS Price | $3.75 |

FIG 4a

NODS Pricing Example
Short NODS $60/$70 Spread

| | |
|---|---|
| Buy $70 Strike Put | ($7.30) |
| Sell $60 Strike Put | $1.05 |
| Put Net | ($6.25) |
| Put Exposure | $0.00 - $10.00 |
| NODS Price | $6.25 |

FIG 4b

NODS Execution Put
Examples $60/$70

| | Final Security Price | | |
|---|---|---|---|
| | $55 | $65 | $75 |
| $70 Strike Put Exercised Against NODS | ✓ | ✓ | ✗ |
| Payout | ($15.00) | ($5.00) | ---- |
| $60 Strike Put Exercised For NODS | ✓ | ✗ | ✗ |
| Payout | $5.00 | ---- | ---- |
| Put Net | ($10.00) | ($5.00) | |
| NODS Payout | ---- | $5.00 | $10.00 |

FIG 5a

| | Final Security Price | | |
|---|---|---|---|
| | $55 | $65 | $75 |
| $70 Strike Put Exercised For NODS | ✓ | ✓ | ✗ |
| Payout | $15.00 | $5.00 | ---- |
| $60 Strike Put Exercised Against NODS | ✓ | ✗ | ✗ |
| Payout | ($5.00) | ---- | ---- |
| Put Net | $10.00 | $5.00 | |
| NODS Payout | $10.00 | $5.00 | ---- |

FIG 5b

NODS Execution Call
Examples $60/$70

Long NODS (call)
- 504c High (octagon)
- 505c Low (triangle)
- 501c

| | Final Stock Price | | |
|---|---|---|---|
| | $55 | $65 | $75 |
| $70 Strike Call Exercised Against NODS | ✗ | ✗ | ✓ |
| Payout | ---- | ---- | ($5.00) |
| $60 Strike Call Exercised For NODS | ✗ | ✓ | ✓ |
| Payout | ---- | $5.00 | $15.00 |
| Call Net | ---- | $5.00 | $10.00 |
| NODS Payout | ---- | $5.00 | $10.00 |

FIG 5c

Short NODS (call)
- 505d High (triangle)
- 504d Low (octagon)
- 501d

| | Final Stock Price | | |
|---|---|---|---|
| | $55 | $65 | $75 |
| $70 Strike Call Exercised For NODS | ✗ | ✗ | ✓ |
| Payout | ---- | ---- | $5.00 |
| $60 Strike Call Exercised Against NODS | ✗ | ✓ | ✓ |
| Payout | ---- | ($5.00) | ($15.00) |
| Call Net | ---- | ($5.00) | ($10.00) |
| NODS Payout | $10.00 | $5.00 | ---- |

SYSTEM AND METHOD FOR CREATING AND TRADING NEAR ONE DELTA SECURITIES

RELATED APPLICATIONS

This disclosure claims priority to provisional Patent Application No. 60/804,730, filed Jun. 14, 2006 which is hereby incorporated by reference.

FIELD OF THE INVENTION

The present invention is generally directed to apparatuses, methods and systems for providing and trading derivative instruments, and more particularly to apparatuses, methods and systems for generating and exchanging near one delta securities.

BACKGROUND OF THE INVENTION

Certain types of investment instruments allow for losses beyond the capital inherently present in the instrument itself. For example, the sale of a put option—i.e. the obligation to buy the underlying security at the option's strike price—creates excess losses for the seller when the market price of the underlying security falls to a point below the strike price of the option minus the cost of the put. In such a situation, when the put is exercised, the seller must have funds available to cover the losses caused by the low market price. This is in contrast to securities like stocks in which the total amount of capital at risk is put up at the time of the purchase.

Accordingly, an entity trading in these types of securities must have collateral or credit sufficient to cover its potential losses. Because of this requirement, regulatory controls, liquidity issues and risk aversion prevent certain investors from taking advantage of these types of derivative investments, or at least from doing so efficiently or economically. A 40 Act Fund is one example of an entity that is regulated in a way that makes it difficult to invest in option shorts, and the like.

SUMMARY OF THE INVENTION

A financial instrument is disclosed that provides spread exposure in an underlying security within an upper and lower range of strikes. This is accomplished by combining a long option for the underlying security at one strike price and a short option for the underlying security at a different strike price, where the difference between the two strikes creates the spread exposure and the choice of option type for the high and low strikes determines whether the overall spread is short or long. The financial instrument is then priced such that the cost of the instrument prevents any possible negative value total returns at the exercise date of the underlying options. In other words, the option spread creates a lower limit on the possible downside risk in the transaction and the purchase price insures that at inception the financial instrument has no possible negative values. In this way, options market trading can be accomplished without requiring additional collateral, credit or insurance. Accordingly, such an instrument can be constructed to provide near one delta financial exposure, or other deltas of exposure.

The implementation of these near one delta securities (NODS) are further supported by the creation of a NODS market. The market acts to price, create, buy, sell, trade, evaluate and exercise NODS. One example of a NODS market transaction is as follows. The NODS market receives a request for spread exposure on an underlying security from an investor. The market then prices options for the underlying security from an options market. Upon receipt of the options pricing information, the cost of the requested spread exposure is calculated such that the price will cover any maximum possible loss and avoid any negative returns at the time the options expire. This calculated pricing information is provided to one or more investors. Upon receipt a purchase request for the spread exposure and payment of the spread's cost, the options spread is created by transactions in the options market. The NODS is then created from the options spread and the investor's purchase is confirmed and recorded. At the expiration of the underlying options, the options market is consulted to determine the options' value and any gains or losses. Any positive options in the NODS are exercised and any losses in the options are paid out of the NODS value. Any net positive return left over in the NODS is transferred to the investor. In addition to holding the NODS until expiration, the NODS can be traded or otherwise executed prior to expiration, with its price based on the current value of its underlying options in the options market.

BRIEF DESCRIPTION OF THE DRAWINGS

The accompanying appendices and/or drawings illustrate various non-limiting, representative, inventive aspects in accordance with the present disclosure.

The leading number of each reference numeral indicates the first drawing in which that reference numeral is introduced. For example, step 336 is first introduced in FIG. 3.

DETAILED DESCRIPTION

The NODS

A Near One Delta Security (NODS) provides an efficient structure for trading in options spreads without having to secure the purchaser against its down side risk. The NODS investment instrument packages both sides of the option spread into a complete security that is priced to cover any possible downside risk in the spread position.

Figure 1A:
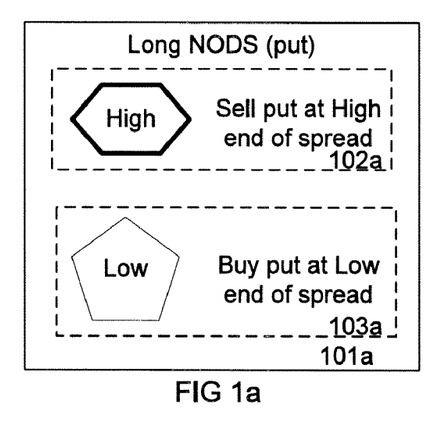
FIGS. 1a-1d show example embodiments of NODS.

FIGS. 1a-1d show exemplary embodiments of various kinds of NODS instruments. FIG. 1a shows a NODS comprised of put options used to create a long spread, which represents the investor's interest in the security within a particular range of prices. The long put spread NODS 101a is comprised of two put options: one with a strike price at the high end of the spread range, and the other with a strike price on the low end of the spread range. Both of the options would expire on the same date.

The long put spread NODS 101a would be used by an investor to take a position in an underlying security that the investor believes will increase in value over some time period as given by the NODS expiration date. The NODS is comprised of a short put 102a with a strike price at the high end of the spread range. In the options market a short put alone would obligate an investor to buy the underlying security at the strike price. With typical options trading, if the investor is correct and the price of the security goes up in value and above the strike price of the short put 102a, the option will not be exercised and the investor would have profited by the amount received from the sale of the short put. If, however, the price of the security goes below the strike price the short put will be exercised and the investor will effectively be obligated to pay the difference between the strike price and the current market price of the stock, which could possibly expose the investor to significant downside risk. To buffer against this possibility and limit the investor's risk to just the NODS spread, the NODS further comprises a long put 103a with a strike price at the low end of the spread range. The long put 103a gives the investor the option to sell the stock at a strike price equal to the low end of the spread. This essentially buffers the maximum amount of possible loss at the spread range.

Figure 1B:
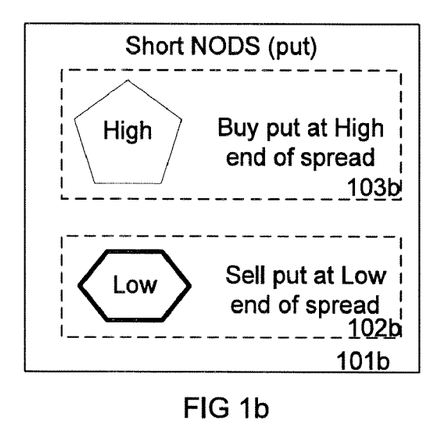

FIG. 1b shows another exemplar NODS type. The short put spread NODS 101b embodies an option spread that would be purchased by an investor that believes the value of the underlying security will go down. The short put spread NODS is comprised of a short put 102b with a strike price at the low end of the spread range and a long put 103b with a strike price at the high end of spread range.

Figure 1C:
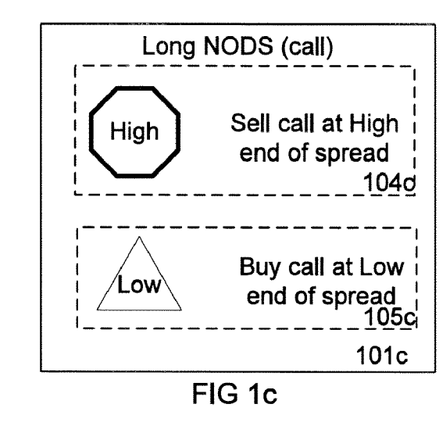
Figure 1D:
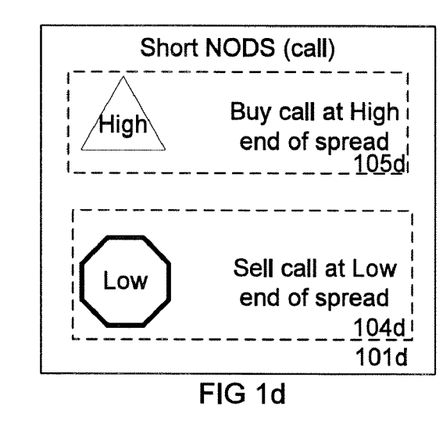

As shown in FIGS. 1c-d, the long and short spread NODS can also be embodied with pair of call options. FIG. 1c demonstrates an embodiment of a long call spread NODS 101c. The long call spread NODS is comprised of a long call 105c with a strike price at the low end of the spread and a shot call 104c with a strike price at the high end of the spread. Conversely, the short call spread NODS 101d is comprised of a short call 104d with a strike price at the low end of the spread and a long call 105d with a strike price at the high end of the spread.

With regard to the various NODS shown in FIGS. 1a-d, the pair of long NODS are essentially equivalent, as are the pair of short NODS, if they are taken across the same spread because they expose the investor to equivalent delta in the underlying security.

The NODS Market

Figure 2:
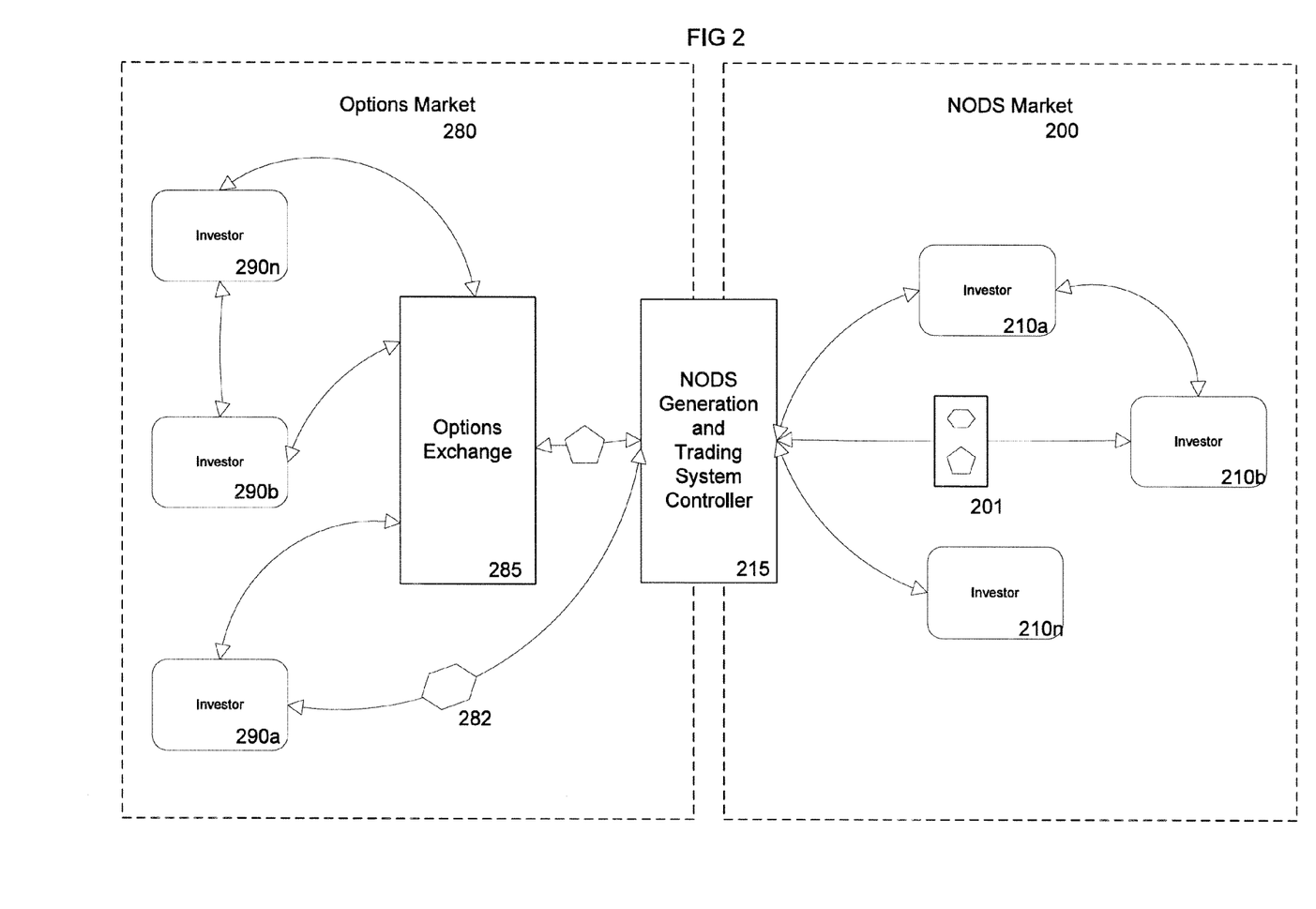
FIG. 2 shows an overview of an embodiment of a trading system incorporating NODS.

FIG. 2 shows an example implementation of a trading system involving NODS. In this exemplary embodiment, the NODS Market 200 comprises one or more investors, 210a-n, and the NODS Generation and Trading System Controller (GTSC) 215. As indicated by the arrows, the investors in the NODS Market can communicate and conduct transactions with the GTSC and each other. In these communications, the investors would buy, sell and trade NODS and query the GTSC for NODS pricing/value information. The investors could be embodied by any entity that might participate in a market, such as, individuals, funds, brokers, automated trading systems, etc. The investors could access the system through any of a number of communications interfaces, such as networked computer connections, telephonically, in person, etc.

The GTSC 215 operates to create, issue, manage, trade and exercise NODS. As shown in the embodiment of FIG. 2, the GTSC may straddle the NODS Market and the Options Market 280 to create, value, trade and exercise NODS. The Options Market would comprise an options exchange 285 and various investors 290a-n.

In participating in the NODS market, for example, an investor 210b might request a NODS product with a particular spread for a particular security from the GTSC. As discussed above that product would comprise a pair of options in the underlying security. To fulfill the investor's request, the GTSC would interface with the options market to price and acquire the required options. For example, the GTSC might create the requested NODS as put spread by selling a short put 282 to investor 290a and buying a long put 283 on the exchange 285. With the two sides of the spread acquired, the NODS 201 can be transferred to the investor 210b. This transfer may only be symbolic, such a confirmation of the NODS purchase and a recordation of ownership in a NODS transaction database maintained by the GTSC.

The GTSC could be embodied in various types of computer systems, either unitary or distributed. The NODS Marketplace might also be comprised of multiple GTSC's run by various entities. The computer systems embodying the GTSC could also be directly networked to the market participants. Or the system could be run from a central location with trades communicated to the system locally. An example embodiment of a computer systemization of the GTSC is described below with reference to FIG. 6.

It should be noted that while the NODS Market in FIG. 2 is shown as interconnected with an Options Market, this is not necessarily required. NODS markets can be developed without interacting with and trading in an associated Options Market. For example, a NODS market could develop for a range of securities that do not have an established Options Market. Or, the NODS could be sold on their own exchange without actually buying and selling the options from the counterpart Options Market. In this case, however, a mechanism may be needed to equalize the prices between the Options and NODS market to avoid large price discrepancies that would lead to arbitrage between the two markets.

The NODS Lifecycle

Figure 3:
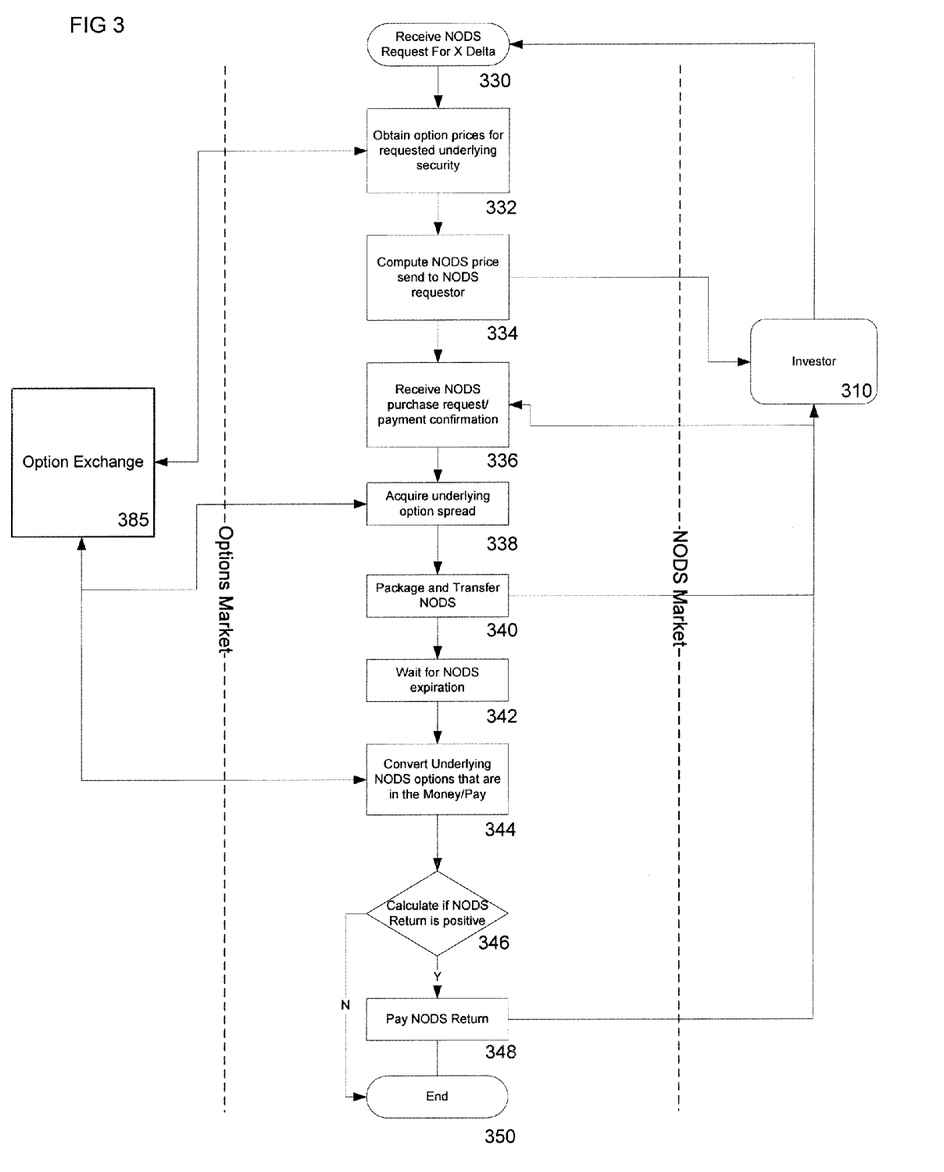
FIG. 3 shows an example embodiment for a process of generating and using NODS.

Figure shows one embodiment of a process for practicing a NODS market. The disclosed process or portions thereof would be implemented via the GTSC. Many of the steps shown could also be conducted out of the order shown or in parallel. The process begins at 330 with the receipt from an investor 310 of a request for a NODS with a particular spread, over a particular time, for a particular underlying security. This request may, for example, take the form of a quote look up in a trading system or website. Moreover, in another embodiment the price request may only identify the underlying security of interest. In which case, information about some or all of the available NODS for that security would be provided.

In step 332 the option prices for the underlying security are obtained from the options exchange 385 of the options market. In step 334 the prices are then used to calculate the price of the NODS requested and communicate those prices back to the requesting investor 310. The specifics of NODS pricing are discussed below. It should be understood that the price request and computation steps could take place out of the order shown in FIG. 3. For example, the trading system might regularly calculate the current prices for some or all NODS and store those prices for display upon request.

If the investor 310 was interested in buying one or more NODS a request would be made and received, step 336, by the trading system. The system could require confirmation of payment along with the receipt of the purchase request or other payment arrangements could be made. In an additional and/or alternative embodiment the system could execute trades pursuant to market, stop, limit or stop-limit orders.

In step 338, the trading system acquires the underlying option spread by selling and buying the relevant options in the options market. The options are then used to create the NODS, which is transferred to the investor, step 340. As noted above, the act of transferring the NODS might not result in the physical transfer of anything. Instead, a database representing the account of the investor is edited to indicate the ownership of the NODS. Similarly, the creation of the NODS might be embodied by recording in a database the parameters of NODS.

At step 342, the system waits on this transaction until the expiration date of the NODS, which might be some time. While this particular example is shown in a linear execution, the NODS created might change hands in the NODS market any number of times prior to expiration date. Moreover, the NODS could also be broken up to be exercised and sold via the options market at anytime up to the expiration date. Breaking up the NODS, however, would cause it to lose its NODS function.

Steps 344-350 show the process of NODS valuation and payout at expiration. In this example, at the expiration date the options underlying the NODS are exercised on the options market. Long options that are in the money are exercised and short options that have been exercised are paid out, step 344. The total return on the NODS is calculated, step 346, if the total return is not positive no return is paid and the NODS lifecycle ends, step 350. Otherwise, the Investor is paid the proceeds of the NODS, step 348, and then NODS lifecycle ends, step 350. If the NODS was sold prior to the expiration date its current value would be computed based on the current value in the underlying options, or, in an American Style options market, the options could be exercised. Examples of different payout scenarios are discussed in further detail in regard to FIGS. 5a-d.

NODS Pricing

Figure 4A:
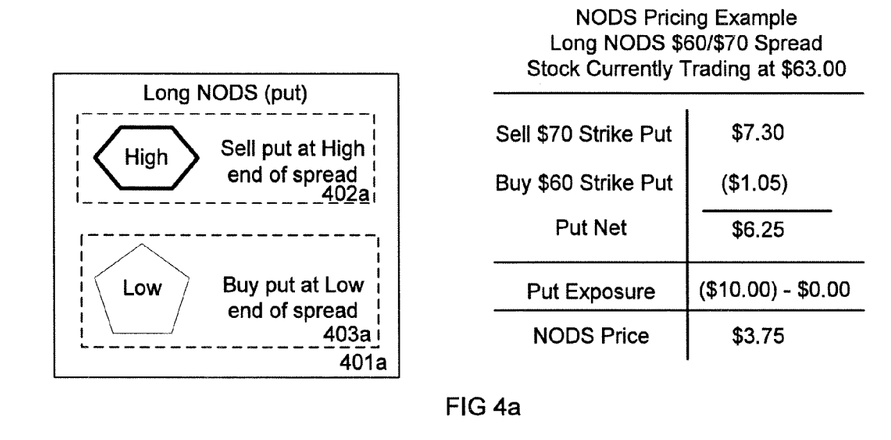
FIGS. 4a-4b show NODS pricing examples.
Figure 4B:
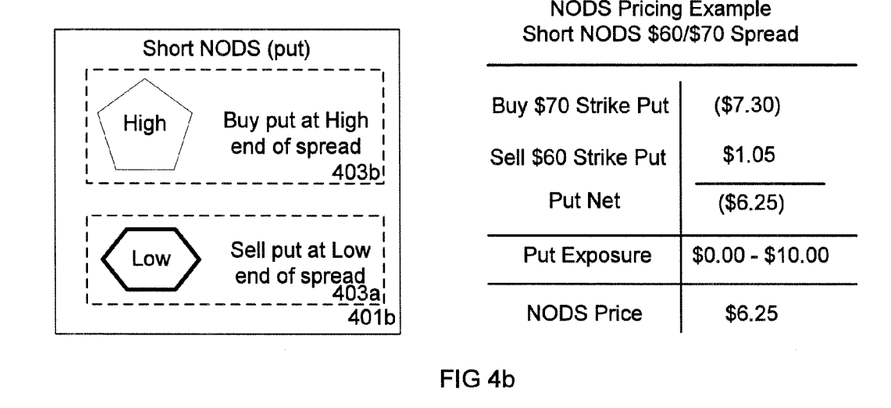

FIGS. 4a-b show how NODS are priced with reference to example long 401a and short 401b NODS spreads. Both the examples are directed to a $10 spread for an example stock that is currently trading at $63.00 and NODS with upper and lower strike prices of $70 and $60, respectively. FIG. 4a shows the price calculation for a long NODS spread for the stock calculated using put options. To effectuate a long position, a put is sold with a $70 strike price, which brings in $7.30 in proceeds; and, a put is bought with a $60.00 strike price for $1.05. The net upfront premium for the put spread purchase and sale is positive $6.25. In a typical options transaction this net income would be directly provided to the investor. However, the NODS must ensure all downside risk is covered in advance. Accordingly, the total downside exposure for the put spread is considered. As shown, the possible exposure for the put spread at expiration will be between negative $10.00 and $0.00. The negative $10.00 downside exposure is partially offset by the $6.25 netted in the acquisition of the put spread, which leaves $3.75 of uncovered downside risk. This $3.75 is the price of the NODS and ensures that NODS value at expiration will be greater than or equal to zero. The operators of the NODS market gain the benefit of holding this money during the NODS lifespan.

FIG. 4b shows the price calculation for a short NODS spread for the stock also calculated using put options. To effectuate a short position, a put is sold with a $60 strike price, which brings in $1.05 in proceeds; and, a put is bought with a $70.00 strike price, which costs $7.30. The net cost of the put spread purchase and sale is negative $6.25 cents. The total possible exposure of the short put spread is $0.00-$10.00. Because this exposure is non-negative the price of the NODS is the $6.25 net price for the spread. In a typical options transaction the investor would keep the $1.05 return from the short put sale, for a NODS this money is held to cover potential NODS losses.

NODS Valuation at Expiration

FIGS. 5a-d show the payouts for short and long NODS based upon both call and put spreads in a variety of in and out of the money scenarios. They each use a $60-$70 spread with returns calculated for final underlying security prices of $55, $65 and $75.

Figure 5A:
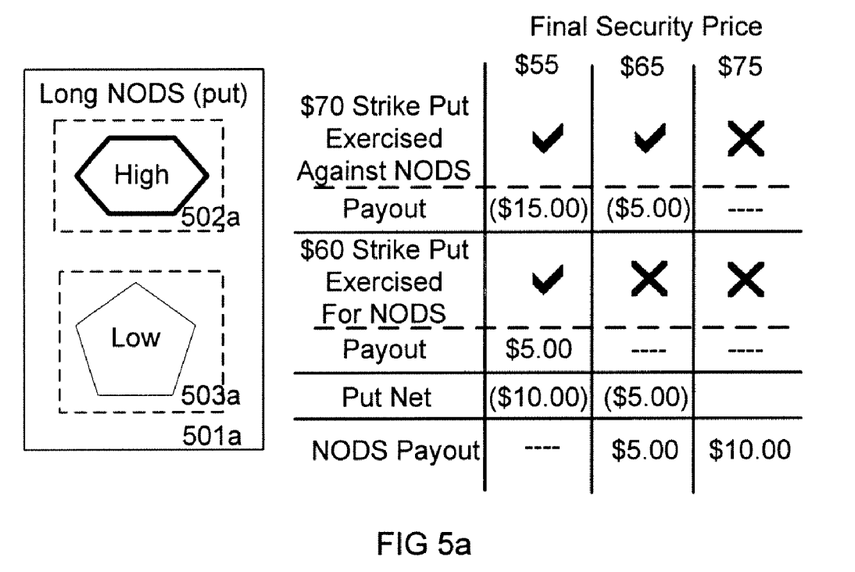
FIGS. 5a-5d show NODS payout expiration examples.

FIG. 5a shows various examples of expiration of a put based long NODS 501a. As noted above, the a put based long NODS is comprised of a short put 502a at the high end of the spread and a long put 503a at the low end of the spread. Accordingly, the short put 502a creates a potentially large downside risk which is buffered to within the spread range by the long put 503a. This buffering is shown in FIG. 5a by the $55.00 final security price example, but would be equally applicable to any final security price below the low end of the spread range.

Turning to the specifics of the $55.00 final security price example, the price has dropped below the NODS spread range and because this is a long spread losses are incurred. The $70.00 short put 502a will be exercised by its purchaser resulting in a $15.00 loss. The $60.00 long put 503a will be exercised gaining $5.00 and offsetting any loss from the short put 502a over $10.00. Thus, the net payout from the exercise of the put options comprising the NODS is negative $10.00. As shown in the discussion of FIG. 4a, the NODS at purchase held positive $10.00 of value, $6.25 netted in acquiring the puts and $3.75 paid by the NODS purchaser. This $10.00 of NODS value is used to pay the put losses and the NODS is now worth $0.00, which equates to a $3.75 loss to the NODS investor.

As shown in FIG. 5a, a $65.00 final security price would result in some payout on the NODS. The $70.00 short put 502a will still be exercised by its purchaser resulting in a $5.00 loss. The $60.00 long put 503a is not in the money and will not be exercised. The $5.00 loss will be paid out of the NODS's inherent $10.00 value and the NODS investor will receive a $5.00 payout, which is equal to a $1.25 payout on the investor's $3.75 investment.

The FIG. 5a $75.00 final price example exemplifies a maximum positive payout for the long NODS investor. The high final share price means that neither the short put 502a nor the long 503a will be exercised. Accordingly, the entire $10.00 of inherent NODS value is paid out to the investor who receives $6.25 on the $3.75 initial investment.

Figure 5B:
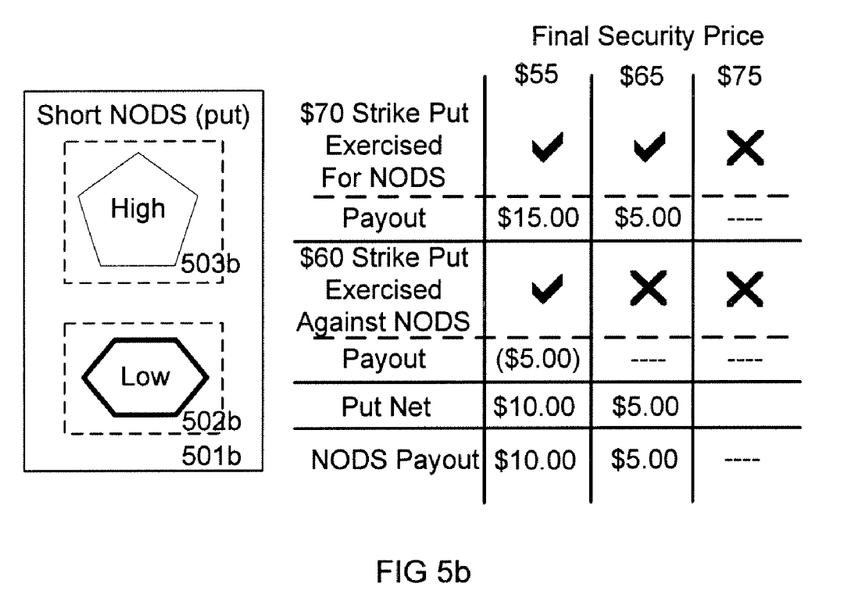

FIG. 5b shows how the same ending security prices would affect a short put NODS. The investor payouts for the examples are of course reversed because the investor expected that the security would go down in price. If the final price for the underlying security is $55.00 the $70.00 strike long put 503b purchased by the NODS will be exercised and will payout a positive $15.00. This gain, however, will be offset by the exercise of the $60.00 strike short put 502b, which results in a $5.00 loss to the NODS. In this example, the short put 502b may appear to be doing more harm than good. But, the advantage of the short put 502b was that it lowered the price of the NODS at inception by offsetting the cost of the long put. The short put NODS had zero inherent value at the time of purchase, thus the $10.00 resulting from the exercise of the put options is paid out to the investor. Accordingly, NODS investor receives a $3.75 on its $6.25 investment.

As shown in FIG. 5b, at a $65.00 final security price, the $70.00 long put 503b is in the money and pays out $5.00. The $60.00 short put 502b is not in the money and is not exercised, resulting in $5.00 paid to the NODS investor, which represents a $1.25 loss on the investor's $6.25 NODS investment.

The FIG. 5b $75.00 final security price represents the worst case scenario for the short NODS investor. Neither of the put options are exercised and there is no payout on the NODS, which equates to a total loss of the $6.25 paid by the NODS investor.

Figure 5C:
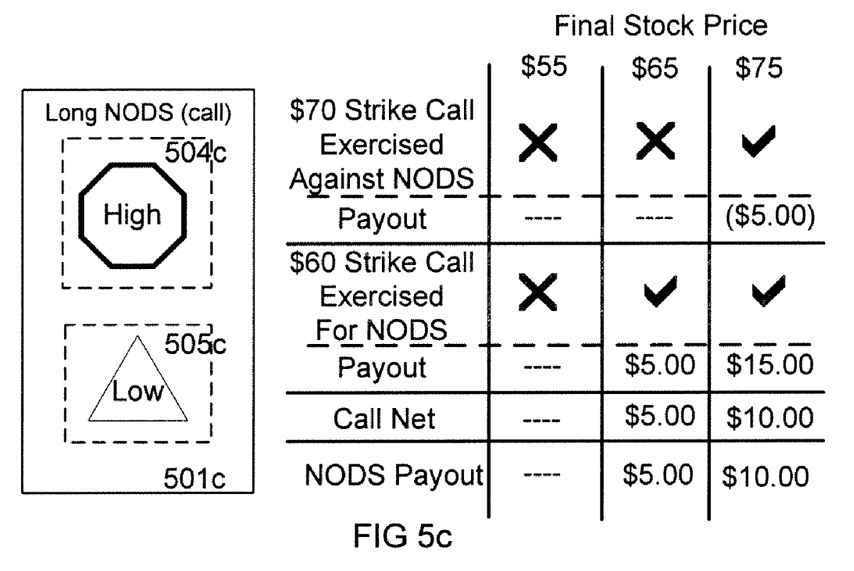
Figure 5D:
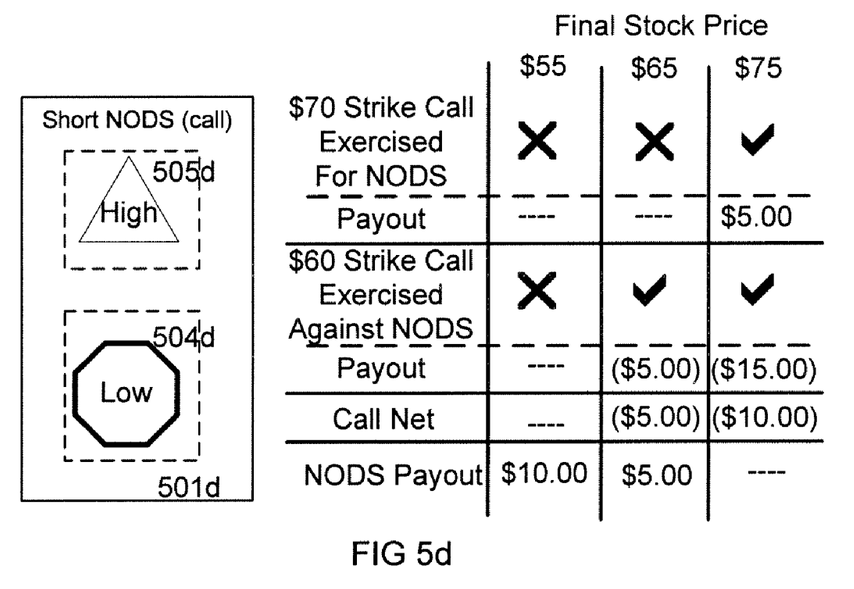

FIGS. 5c-d shown similar short and long NODS positions carried out through call options. As can be seen, the NODS payouts for the short and long call NODS are equivalent to the respective short and long put NODS, but the return from the under lying options are reversed.

NODS Generation and Trading System Controller

Figure 6:
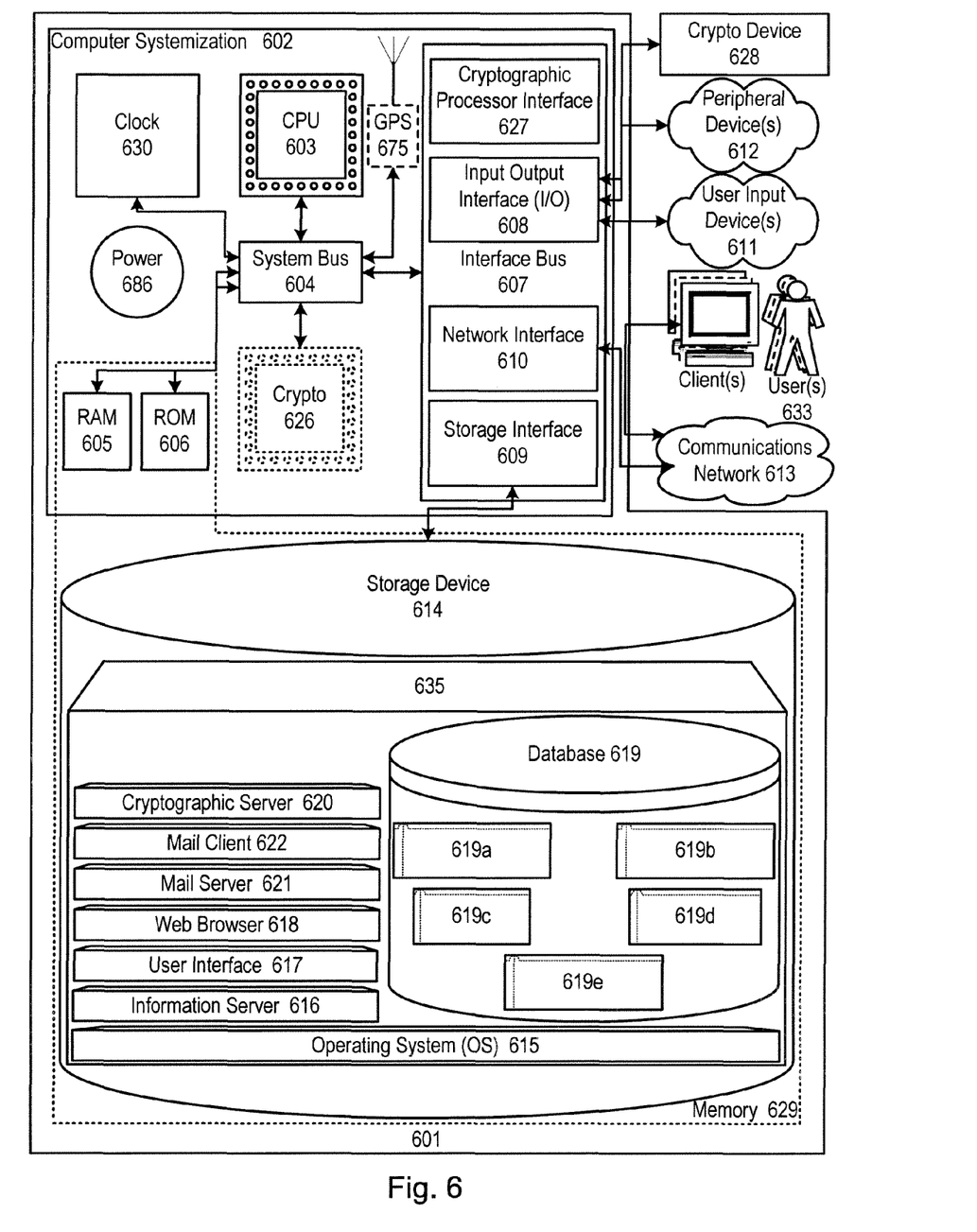
FIG. 6 is a block diagram illustrating example embodiments of the NODS Generation and Trading System Controller.

FIG. 6 of the present disclosure illustrates inventive aspects of an NODS Generation and Trading System Controller (GTSC) 601 in a block diagram. In this embodiment, the NODS GTSC 601 may serve to create, trade, evaluate, query, process, store, search, serve, identify, instruct, generate, match and/or update NODS, NODS transactions and NODS bearing accounts.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the NODS GTSC 601 may be connected to and/or communicate with entities such as, but not limited to: one or more users from user input devices 611; peripheral devices 612; and/or a communications network 613.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The NODS GTSC controller 601 may be based on common computer systems that may comprise, but are not limited to, components such as: a computer systemization 602 connected to memory 629.

Computer Systemization

A computer systemization 602 may comprise a clock 630, central processing unit (CPU) 603, a read only memory (ROM) 606, a random access memory (RAM) 605, and/or an interface bus 607, and most frequently, although not necessarily, are all interconnected and/or communicating through a system bus 604. Optionally, the computer systemization may be connected to an internal power source 686. Optionally, a cryptographic processor 626 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, Core and/or XScale; and/or the like processor(s). The CPU interacts with memory through signal passing through conductive conduits to execute stored program code according to conventional data processing techniques. Such signal passing facilitates communication within the NODS GTSC and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 686 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the NODS GTSC thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like.

Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the NODS GTSC is accessible through remote clients 633b (e.g., computers with web browsers) by users 633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 611 may be card readers, dongles, finger print readers, gloves, graphics tablets, joysticks, keyboards, mouse (mice), remote controls, retina readers, trackballs, trackpads, and/or the like.

Peripheral devices 612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the NODS GTSC may be embodied as an embedded, dedicated, and/or monitor-less (i.e., headless) device, wherein access would be provided over a network interface connection.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the NODS GTSC and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 629 may contain a collection of program and/or database modules and/or data such as, but not limited to: operating system module(s) 615 (operating system); information server module(s) 616 (information server); user interface module(s) 617 (user interface); Web browser module(s) 618 (Web browser); database(s) 619; cryptographic server module(s) 620 (cryptographic server); the NODS module(s) 635; and/or the like (i.e., collectively a module collection). These modules may be stored and accessed from the storage devices and/or from storage devices accessible through an interface bus. Although non-conventional software modules such as those in the module collection, typically, are stored in a local storage device 614, they may also be loaded and/or stored in memory such as: peripheral devices, RAM, remote storage facilities through a communications network, ROM, various forms of memory, and/or the like.

The database modules of the NODS GTSC may contain records of NODS transactions, records representing the NODS themselves, and records representing the NODS accounts and holdings of participants in the NODS market.

Operating System

The operating system module 615 is executable program code facilitating the operation of the NODS GTSC. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the NODS GTSC to communicate with other entities through a communications network 613. Various communication protocols may be used by the NODS GTSC as a subcarrier transport mechanism for interaction, such as, but not limited to: multicast, TCP/IP, UDP, unicast, and/or the like.

Information Server

An information server module 616 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the NODS GTSC based on the remainder of the HTTP request. For example, a request such as http://123.124.125.126/myInfo.html might have the IP portion of the request "123.124.125.126" resolved by a DNS server to an information server at that IP address; that information server might in turn further parse the hap request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the NODS GTSC, operating systems, other program modules, user interfaces, Web browsers, and/or the like.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 617 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 618 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the NODS enabled nodes. The combined application may be nugatory on systems employing standard Web browsers.

NODS GTSC Module

The NODS GTSC module 635 is stored program code that is executed by the CPU. The NODS GTSC module affects accessing, obtaining and the provision of NODS GTSC, and/or the like across various communications networks.

The NODS GTSC module may be enabled to access information between nodes by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. The NODS GTSC module may communicate to and/or with other modules in a module collection, including itself, and/or facilities of the like. Most frequently, the NODS GTSC module communicates with participants in the NODS or Options markets to create, trade, evaluate, query, process, store, search, serve, identify, instruct, generate, match and/or update NODS, NODS transactions and NODS bearing accounts.

Distributed NODS GTSC Module

The structure and/or operation of any of the NODS GTSC components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the NODS GTSC will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A securities trading system comprising:
    a memory configured to store a plurality of instructions;
    a processor disposed in communication with the memory wherein upon execution of the instructions by the processor, the processor is configured to:

receive a request for a spread exposure on an underlying security from a first party;

retrieve cost information for the requested spread exposure;

calculate cost of components including a long put spread and a short put spread, the components achieving the requested spread exposure to cover maximum possible downside risk in the requested spread exposure from the retrieved cost information;

determine an instrument price for an instrument that achieves the requested spread exposure based at least in part on the calculated cost of the components to achieve the requested spread exposure;

provide the determined instrument price for the instrument to the first party;

receive a purchaser indicator from the first party for purchasing the instrument; and facilitate the generation of the instrument that achieves the requested spread exposure based on the received purchase indicator.

2. The system of claim 1 wherein the processor is further configured to:

sell the spread exposure.

3. The system of claim 1 wherein the spread exposure comprises a short and a long option in the underlying security both having the same execution date.

4. The system of claim 3 wherein the processor is further configured to:

receive an instruction from the first party to sell the spread exposure and selling the spread exposure, wherein the sale of the spread exposure comprises independently disposing of the long option and the short option.

5. The system of claim 3 wherein the processor is further configured to:

close out the options at the execution date.

6. A processor-implemented method for providing a spread exposure instrument, comprising:

receiving a request for a spread exposure on an underlying security from a first party;

retrieving by a processor cost information for the requested spread exposure;

calculating by the processor cost of components including a long put spread and a short put spread, the components achieving the requested spread exposure to cover maximum possible downside risk in the requested spread exposure from the retrieved cost information;

determining by the processor an instrument price for an instrument that achieves the requested spread exposure based at least in part on a calculated cost of the components to achieve the requested spread exposure;

providing the determined instrument price for the instrument to the first party;

receiving a purchaser indicator from the first party for purchasing the instrument; and facilitating the generation of the instrument that achieves the requested spread exposure based on the received purchase indicator.

7. The method of claim 6, wherein the price associated with the instrument includes a premium.

8. The method of claim 6, wherein the instrument includes an expiration date.

9. The method of claim 8, wherein the price associated with the instrument is further based on the expiration date.

10. The method of claim 8, wherein the instrument may be exercised before the expiration date.

11. The method of claim 8, wherein the instrument may only be exercised on the expiration date.

12. A processor-readable non-transitory storage medium storing a plurality of instructions executable by a processor to:

receive a request for a spread exposure on an underlying security from a first party;

retrieve cost information for the requested spread exposure;

calculate a cost of components including a long put spread and a short put spread, the components achieving the requested spread exposure to cover maximum possible downside risk in the requested spread exposure from the retrieved cost information;

determine an instrument price for an instrument that achieves the requested spread exposure based at least in part on the calculated cost of the components to achieve the requested spread exposure;

provide the determined instrument price for the instrument to the first party;

receive a purchaser indicator from the first party for purchasing the instrument; and facilitate the generation of the instrument that achieves the requested spread exposure based on the received purchase indicator.

\* \* \* \* \*